(12) United States Patent
Matsushima

(10) Patent No.: US 8,330,970 B2
(45) Date of Patent: Dec. 11, 2012

(54) IMAGE PROCESSING DEVICE, IMAGE PROCESSING METHOD, AND RECORDING MEDIUM

(75) Inventor: Yuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 894 days.

(21) Appl. No.: 12/314,812

(22) Filed: Dec. 17, 2008

(65) Prior Publication Data

US 2009/0168108 A1    Jul. 2, 2009

(30) Foreign Application Priority Data

Dec. 26, 2007  (JP) ................ 2007-334204

(51) Int. Cl.
*H04N 1/405* (2006.01)
(52) U.S. Cl. ........... 358/1.13; 350/468; 350/530
(58) Field of Classification Search ............ 358/1.9, 358/2.1, 1.13, 468, 516–520, 530, 501–502
See application file for complete search history.

(56) References Cited

U.S. PATENT DOCUMENTS

| | | | |
|---|---|---|---|
| 6,816,179 B2 | 11/2004 | Hanyu | |
| 6,873,729 B2 | 3/2005 | Matsushima | |
| 7,006,692 B2 | 2/2006 | Matsushima | |
| 7,034,878 B2 | 4/2006 | Matsushima | |
| 7,167,597 B2 | 1/2007 | Matsushima | |
| 7,251,056 B2 | 7/2007 | Matsushima | |
| 7,315,657 B2 | 1/2008 | Matsushima | |
| 2002/0024609 A1 | 2/2002 | Matsushima | |
| 2002/0025179 A1 | 2/2002 | Toyohara et al. | |
| 2002/0039192 A1 | 4/2002 | Otsuka et al. | |
| 2003/0020974 A1 | 1/2003 | Matsushima | |
| 2003/0099407 A1 | 5/2003 | Matsushima | |
| 2004/0046817 A1 | 3/2004 | Kato et al. | |
| 2004/0061887 A1 | 4/2004 | Murashima | |
| 2004/0126009 A1 | 7/2004 | Takenaka et al. | |
| 2005/0141763 A1 | 6/2005 | Matsushima | |
| 2006/0066671 A1 | 3/2006 | Kato et al. | |
| 2007/0041637 A1 | 2/2007 | Matsushima | |
| 2007/0064250 A1 | 3/2007 | Matsushima | |

(Continued)

FOREIGN PATENT DOCUMENTS

CN        1500637        6/2004

(Continued)

OTHER PUBLICATIONS

Extended European Search Report dated Jan. 28, 2010.

(Continued)

*Primary Examiner* — Thomas D Lee
*Assistant Examiner* — Stephen M Brinich
(74) *Attorney, Agent, or Firm* — Harness Dickey & Pierce, P.L.C.

(57) ABSTRACT

An image processing device has a normal output mode for output at a normal image density and a color material save mode for reducing color material consumption. The image processing device includes at least one of plural image processing units configured to perform color space conversion processing, black processing, γconversion processing, and halftone processing, respectively. The at least one of the plural image processing units for color space conversion processing, black processing, γconversion processing, and halftone processing includes plural processing units including a processing unit of low processing speed for relatively high image quality and a processing unit of high processing speed for relatively low image quality. In the color material save mode, one or more of the at least one of the plural image processing units for color space conversion processing, black processing, γconversion processing, and halftone processing execute the processing unit of high processing speed.

12 Claims, 7 Drawing Sheets

U.S. PATENT DOCUMENTS

| | | |
|---|---|---|
| 2007/0211277 A1 | 9/2007 | Kaneko et al. |
| 2008/0002216 A1 | 1/2008 | Matsushima |

FOREIGN PATENT DOCUMENTS

| | | |
|---|---|---|
| EP | 0 /814 601 | 12/1997 |
| EP | 1 553 464 | 7/2005 |
| EP | 1 734 739 | 12/2006 |
| JP | 09238262 A | 9/1997 |
| JP | 10108029 A | 4/1998 |
| JP | 11146210 A | 5/1999 |
| JP | 2003-66781 | 3/2003 |
| JP | 2003230020 A | 8/2003 |
| JP | 2005217966 A | 8/2005 |
| JP | 2006148747 A | 6/2006 |
| WO | WO2007/032542 | 3/2007 |

OTHER PUBLICATIONS

Chinese Office Action dated Mar. 30, 2011 and English translation thereof.

Chinese Office Action dated Oct. 13, 2010 and English translation thereof.

European Patent Office dated Mar. 20, 2012 for corresponding Application No. 08 172 046.8-1228.

Japanese Office Action dated Jun. 12, 2012 for corresponding Japanese Application No. 2007-334204.

IMAGE PROCESSING DEVICE, IMAGE PROCESSING METHOD, AND RECORDING MEDIUM

BACKGROUND OF THE INVENTION

1. Field of the Invention

The present invention generally relates to an image processing device, an image processing method, and a recording medium, and particularly relates to an image processing device having a color material save mode, an image processing method having a color material save mode, and a recording medium storing an image processing program.

2. Description of the Related Art

Image output devices have been known that have a normal output mode for generating and outputting an image at a normal density and a color material save mode for outputting an image using less color material than would normally be used. The color material save mode is used when the image quality is not important, such as when checking the layout of an output image.

Recent application software has often been used to create color documents containing a mixture of characters, graphics, and images. Therefore, related art color printers use a density conversion method, a method of calculating a logical between a dithered image and a decimation pattern, a pulse modulation method, a method of controlling the amount of light for writing, or the like, in order to reduce color material consumption.

Since these methods reduce the image density of output images, the output images have lower quality than would be achieved in a normal output mode. However, there is a demand for maintaining readability of especially important character images even in a color material save mode.

To meet such a demand, a method is proposed that reduces the usage of a color material for printing an entire image by applying a decimation pattern to an image portion and by reducing the density inside the contours of characters while applying edge enhancement to the character portion. Although this method can save a color material to be used for forming an image, an additional control process is required, and hence the processing speed is undesirably reduced.

Japanese Patent Laid-Open Publication No. 2003-66781 (corresponding to U.S. Patent Application Publication No. 2003/0047099 A1), for example, discloses a color printer that has a color material saving conversion table for each object, such as a character portion and an image portion, and that saves a color material without reducing the processing speed of the printer.

Such a color printer that has a color material saving (toner saving) conversion table for each object, such as a character portion and an image portion, and that saves a color material without reducing the processing speed of the printer, however, does not perform any other process, such as an edge detection, for improving the readability of characters, and hence the readability of a character portion is reduced when usage of a color material is reduced.

SUMMARY OF THE INVENTION

In view of the foregoing, the present invention is directed toward solving one or more of the above problems and balancing the processing speed and the readability of characters.

In one embodiment of the present invention, there is provided an image processing device having a normal output mode for output at a normal image density and a color material save mode for reducing color material consumption. The image processing device includes at least one of a plurality of image processing units configured to perform color space conversion processing, black processing, γ conversion processing, and halftone processing, respectively. The at least one of the plurality of image processing units configured to perform color space conversion processing, black processing, γ conversion processing, and halftone processing, respectively, includes a plurality of processing units including a processing unit of low processing speed for relatively high image quality and a processing unit of high processing speed for relatively low image quality. In the color material save mode, one or more of the at least one of the plurality of image processing units configured to perform color space conversion processing, black processing, γ conversion processing, and halftone processing, respectively, execute the processing unit of high processing speed.

In another embodiment of the present invention, there is provided an image processing method having a normal output mode for output at a normal image density and a color material save mode for reducing color material consumption. The image processing method includes at least one of a plurality of image processing steps of performing color space conversion processing, black processing, γ conversion processing, and halftone processing, respectively. The at least one of the plurality of image processing steps of performing color space conversion processing, black processing, γ conversion processing, and halftone processing, respectively, includes a plurality of processing steps including a processing step of low processing speed for relatively high image quality and a processing step of high processing speed for relatively low image quality. In the color material save mode, one or more of the at least one of the plurality of image processing steps of performing color space conversion processing, black processing, γconversion processing, and halftone processing, respectively, execute the processing step of high processing speed.

In still another embodiment of the present invention, there is provided a computer-readable recording medium storing a computer executable image processing program, the program including computer-executable instructions for executing a method that includes a step of selecting processing of a normal output mode for output at a normal image density or processing of a color material save mode for reducing color material consumption, and a step of executing at least one of a plurality of image processing operations for performing color space conversion, black processing, γ conversion, and halftone processing, respectively. The at least one of the plurality of image processing operations for performing color conversion color space conversion, black processing, γ conversion, and halftone processing, respectively, includes a plurality of processing operations including a processing operation of low processing speed for relatively high image quality and a processing operation of high processing speed for relatively low image quality. The processing of the color material save mode executes the processing operation of high processing speed of one or more of said at least one of the plurality of image processing operations for performing color conversion color space conversion, black processing, γ conversion, and halftone processing, respectively.

According to an aspect of the present invention, it is possible to balance the processing speed and the readability of characters in a color material save mode.

DETAILED DESCRIPTION OF THE PREFERRED EMBODIMENT

Exemplarily embodiments of the present invention are described below with reference to the accompanying drawings. The embodiments described below are preferred embodiments of the present invention, and various technically preferable limitations are included. However, the scope of the present invention is not limited to these embodiments unless otherwise specified in the description provided below.

Note that a color material that can be used in a "color material save mode" is not limited to powdered toner but may include ink for use in inkjet printers and other types of ink.

Configuration

Figure 1:
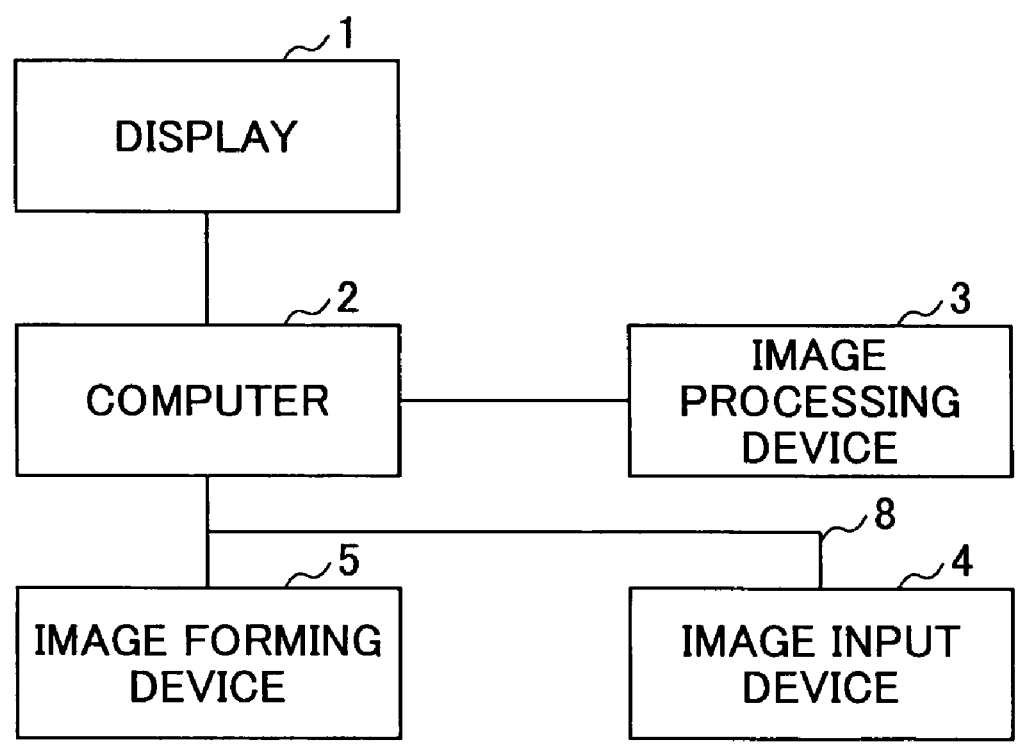
FIG. 1 is a block diagram illustrating an exemplary configuration of an image processing system including an image processing device according to an embodiment of the present invention.

FIG. 1 is a block diagram illustrating an exemplary configuration of an image processing system including an image processing device 3 according to an embodiment of the present invention. The image processing system includes an image display device (display) 1, a computer 2, the image processing device 3 of an embodiment of the present invention, an image input device 4, and an image forming device 5.

The display 1 and the image processing device 3 are directly connected to the computer 2, while the image input device 4 and the image forming device 5 are connected to the computer 2 via a LAN 8.

The computer 2 includes various application software for data processing associated with information processing and image processing and software such as printer drivers to which the present invention is applicable. The display 1 displays various output results. The image processing device 3 provides a function for converting device-specific color signals (RGB, CMY, CMYK, etc.,), which are supplied from the computer 2, into image-forming-device-specific color signals.

The image input device 4 scans image data. Examples of the image input device 4 may include a color scanner and a digital camera. The image forming device 5 can form a color image based on image data (in this embodiment, gradation image data (hereinafter also referred to as "gradation data")). Examples of the image forming device 5 may include a color printer, a copier machine, and a multifunction machine with a color printing function and a copier function. The image forming device 5 may be any device that forms an image using an image forming material, such as an image forming device that forms an image using an inkjet recording method and an image forming device that forms an image using an electrophotographic method.

The number of the input/output devices (the image display device 1, the image input device 4, the image forming device 5, etc.,) is not limited to the number of the input/output devices in the illustrated embodiment.

Configurations of Computer 2 and Image Processing Device 3

Figure 2:
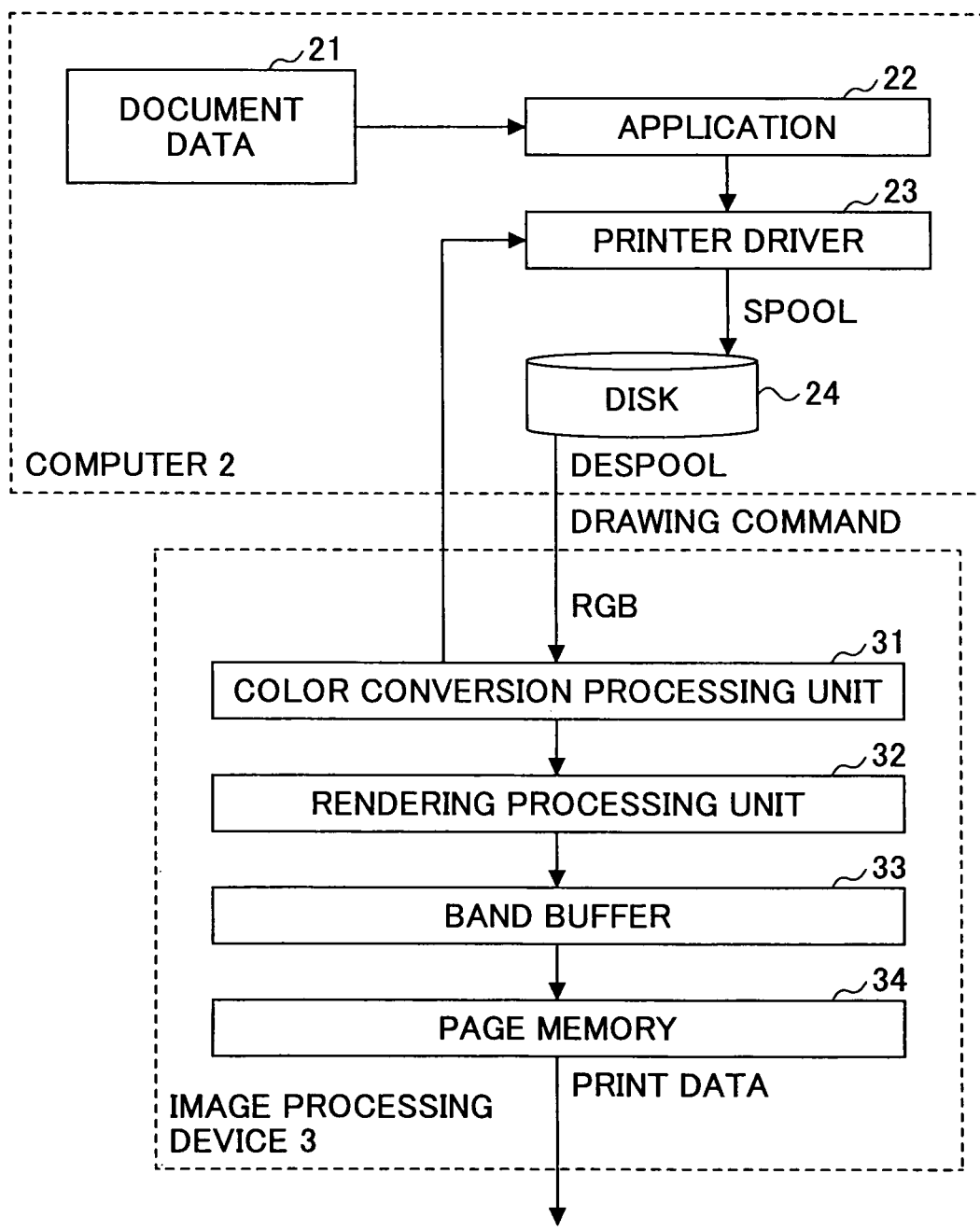
FIG. 2 is a block diagram illustrating exemplary configurations of a computer and an image processing device of an image processing system according to an embodiment of a present invention.

Processing functions of the computer 2 and the image processing device 3 of the image processing system of this embodiment are described below with reference to FIG. 2.

The computer 2 includes various application software 22 for generating document data 21; a printer driver 23 for performing processing, such as conversion of the document data 21 supplied by the application software 22 into drawing commands processable by the image processing device 3, required for printing by the image forming device 5; and a disk (storage unit) 24 for storing the drawing commands supplied by the printer driver 23.

The image processing device 3 includes a color conversion processing unit 31 for performing color conversion processing on RGB format color data of the drawing commands sent from the computer 2, a rendering processing unit 32 for converting data in a command format into image data in a raster format, a band buffer 33 for storing the raster image data, and a page memory 34 for storing the raster image data stored in the band buffer 33. With these configurations, it is possible to convert drawing commands sent from the computer 2 into data processable by the image forming device 5.

Operations

Operations performed by the image processing system of this embodiment are described below. Operations performed by the image processing system include an operation of sending the image data to the image processing device 3 to cause the image forming device 5, which is capable of forming a color image, to form and output (print) an image, receiving the processing result from the image processing device 3, and transmitting the processing result to the image forming device 5, while displaying image data stored in the computer 2 on the display 1.

In this case, the image data are color signals containing color components of R (red), G (green), and B (blue), which are elements of colors for display operations in typical color displays. The computer 2 sends the RGB signals to the image processing device 3 to cause the image processing device 3 to convert the RGB signals into signals of C (cyan), M (magenta), Y (yellow), and K (black), which are color signals containing output color components as control signals for the color image forming device 5. The computer 2 receives the CMYK signals from the image processing device 3 and transmits the CMYK signals to the image forming device 5. Then, the image forming device 5 forms a color image and prints out the color image.

The following describes in detail operations performed by the computer 2 from generation of drawing commands to be sent to the image processing device 3, through image processing, to output to the image forming device 5. A user (operator) operates the computer 2 to edit image data using the application software 22 of the computer 2 while displaying the image data on the display 1.

When editing is completed, the user selects the image forming device 5 for image output and selects a print operation on the application software 22. The printer driver 23 displays print properties for setting printing conditions on the display 1 so that the user may specify various printing conditions in the print properties. As part of specifying printing conditions, the user may select a color material save mode for printing with reduced usage of a color material and may select conditions associated with color material saving in the color material save mode.

When a print operation is selected in the application software 22 and then the print operation is requested in the print properties, the computer 2 transmits document data 11 which are selected on the application software 22 as data to be printed to the printer driver 23. The printer driver 23 converts the document data 11 into drawing commands readable by the image processing device 3 and sequentially stores the drawing commands.

In response to the print request from the computer 2, the image processing device 3 sequentially reads out the drawing commands stored in the disk 24 by the printer driver 23, and transmits color data of the drawing commands to the color conversion processing unit 31.

The color conversion processing unit 31 performs predetermined color conversion processing on the color data to convert the color data in an RGB format to color data in a CMYK format suitable for the image forming device 5, which may be a color printer. The rendering processing unit 32 converts the CMYK color data, which are in a command format, into image data in a raster format. The raster image data are stored in the band buffer 33. Then, the raster image data stored in the band buffer 33 are stored in the page memory 34.

The gradation data stored in the page memory 34 of the image processing device 3 are read out by the computer 2 and are transmitted to the specified image forming device 5. Then, the image forming device 5 forms an image on a to-be-recorded medium and outputs the medium.

Although the image processing device 3, the computer 2, and the image forming device 5 use separate units to perform color conversion processing, rendering, and gradation processing in the above embodiment, these processing functions may be implemented as software (a program) or a dedicated processing device such as ASIC installed in a computer as an information processing device. Alternatively, these functions may be installed in a control unit of the image forming device 5. Further alternatively, these processing functions may be performed by a control device, such as a dedicated print server, that is provided separately from the image forming device 5.

Color Conversion Processing Unit 31

The color conversion processing unit 31 of the image processing device 3 is described below with reference to a first embodiment and a second embodiment. Note that, as mentioned above, the color conversion processing unit 31 may be implemented as a part of the printer driver 23. In the following description, the image forming device 5 uses a recording liquid, and "image forming material saving" and an "image forming material save mode" are referred to as "color material saving" and a "color material save mode". However, other developers such as toner may alternatively be used.

First Embodiment

Not Performing Object Determination in the Color Material Save Mode

Figure 3:
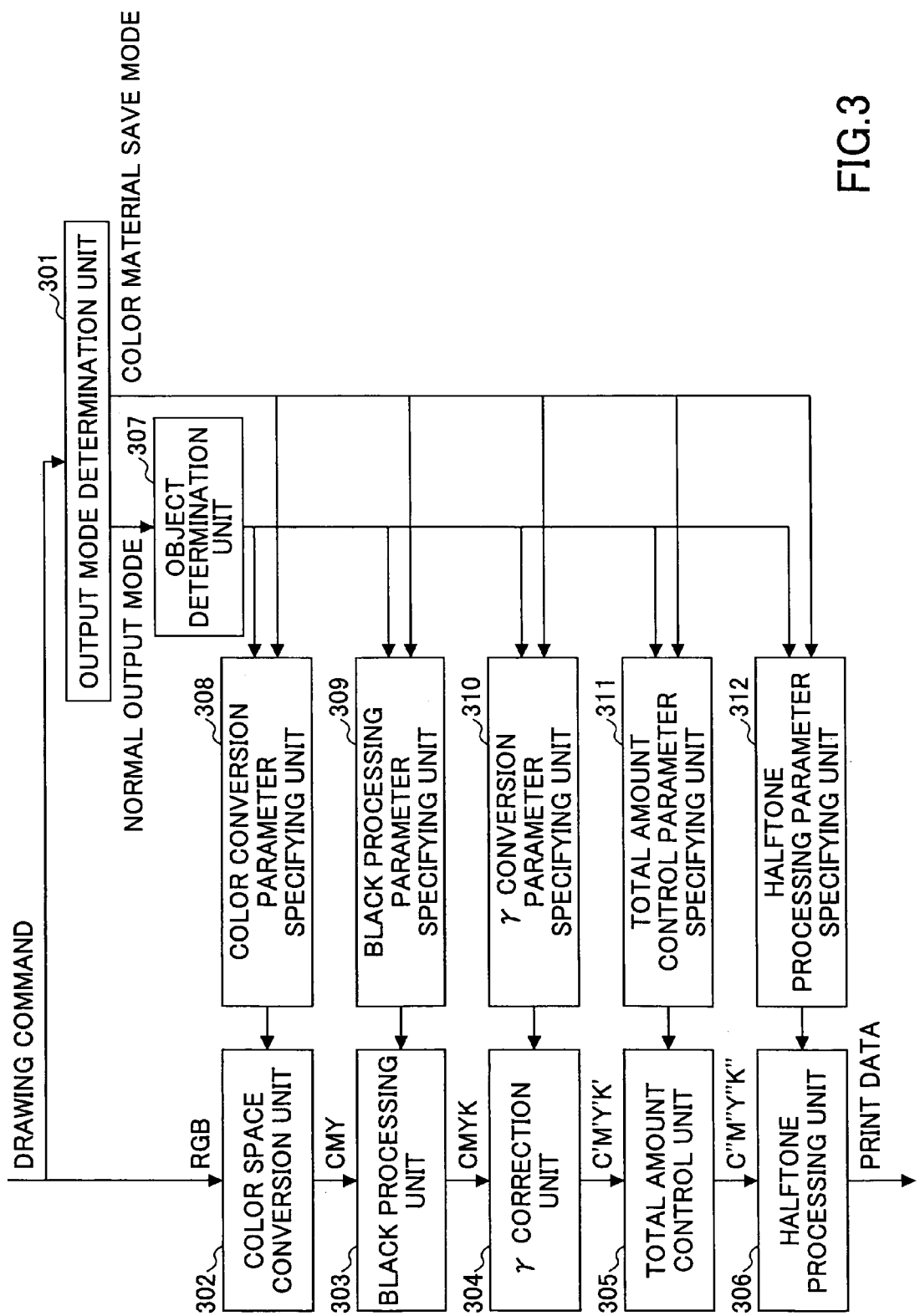
FIG. 3 is a block diagram illustrating a color conversion processing unit according to an embodiment of the present invention.

FIG. 3 is a block diagram illustrating the color conversion processing unit 31 according to this embodiment. The color conversion processing unit 31 includes an output mode determination unit 301 for determining an output mode specified by a user using the printer driver 23 (see FIG. 2) of the computer 2, an object determination unit 307 for performing object determination when the user selects the normal output mode, a color conversion parameter specifying unit 308 for specifying a color conversion parameter, a black processing parameter specifying unit 309 for specifying a black processing parameter, a γ conversion parameter specifying unit 310 for specifying a γ conversion parameter, a total amount control parameter specifying unit 311 for specifying a total amount control parameter, and a halftone processing parameter specifying unit 312 for specifying a halftone processing parameter.

The color conversion processing unit 31 further includes a color space conversion unit 302 for converting input color signals (RGB signals) supplied by the computer 2 into print color signals (CMY signals) using the color conversion parameter specified by the color conversion parameter specifying unit 308 in order to generate CMY signals from RGB image signals and output the CMYK signals, a black processing unit 303 for converting the CMY signal components into CMYK signals by adding K components according to a UCR rate or a UCA rate, a γ correction unit 304 for generating and outputting C"M'Y'K' signals by performing a γcorrection on the CMYK signals according to the image forming engine properties, a total amount control unit 305 for generating and outputting C"M"Y"K" signals according to the maximum total amount of a recording color material with which the image forming device 5 can perform image formation, and a halftone processing unit 306 for converting the C"M"Y"K" signals into gradation data processable by the image forming device 5 by performing halftone processing (gradation processing) such as dither processing on the C"M"Y"K" signals.

If the user selects the normal output mode, the object determination unit 307 determines the type (a character portion or a picture portion) of each object, and an image processing parameter is specified for each object by one or more of the parameter specifying units 308-312. On the other hand, if the user selects the color material save mode, the image quality of the picture portion does not matter, and hence the color conversion parameter specifying unit 308 specifies a predetermined color conversion parameter without performing an object determination. For example, a character mode color conversion parameter is specified as the predetermined image processing parameter in order to maintain the readability of characters.

The following provides a detailed description of the above with reference to color conversion processing performed in the color space conversion unit 302. In the normal output mode, when the object determination unit 307 determines the types of objects, the color conversion parameter specifying unit 308 specifies color conversion parameters appropriate for the objects. Generally, properties for maintaining color saturation are considered important for characters and graphic images, while properties for maintaining brightness are considered important for picture portions. The color conversion parameters are specified in the following manner. Output CMYK signal values (color conversion parameter) corresponding to representative RGB values in the RGB color space are calculated and stored in advance for each object, and the color conversion parameter specifying unit 308 specifies the CMYK signal values (color conversion parameters).

The color space conversion unit 302 converts RGB signals into CMY signals using a three-dimensional look-up table that is created in advance using the color conversion parameters specified by the color conversion parameter specifying unit 308. To be more specific, the color space conversion unit 302 refers to the 3D look-up table, in which the output CMY signal values corresponding to the representative RGB values in the RGB space are calculated and stored in advance, and reads out plural output values from the 3D look-up table to perform interpolation.

That is, conversion from gradation data of a three-dimensional RGB color space into output color component CMY data is color conversion into CMY using memory map interpolation.

Figure 5:
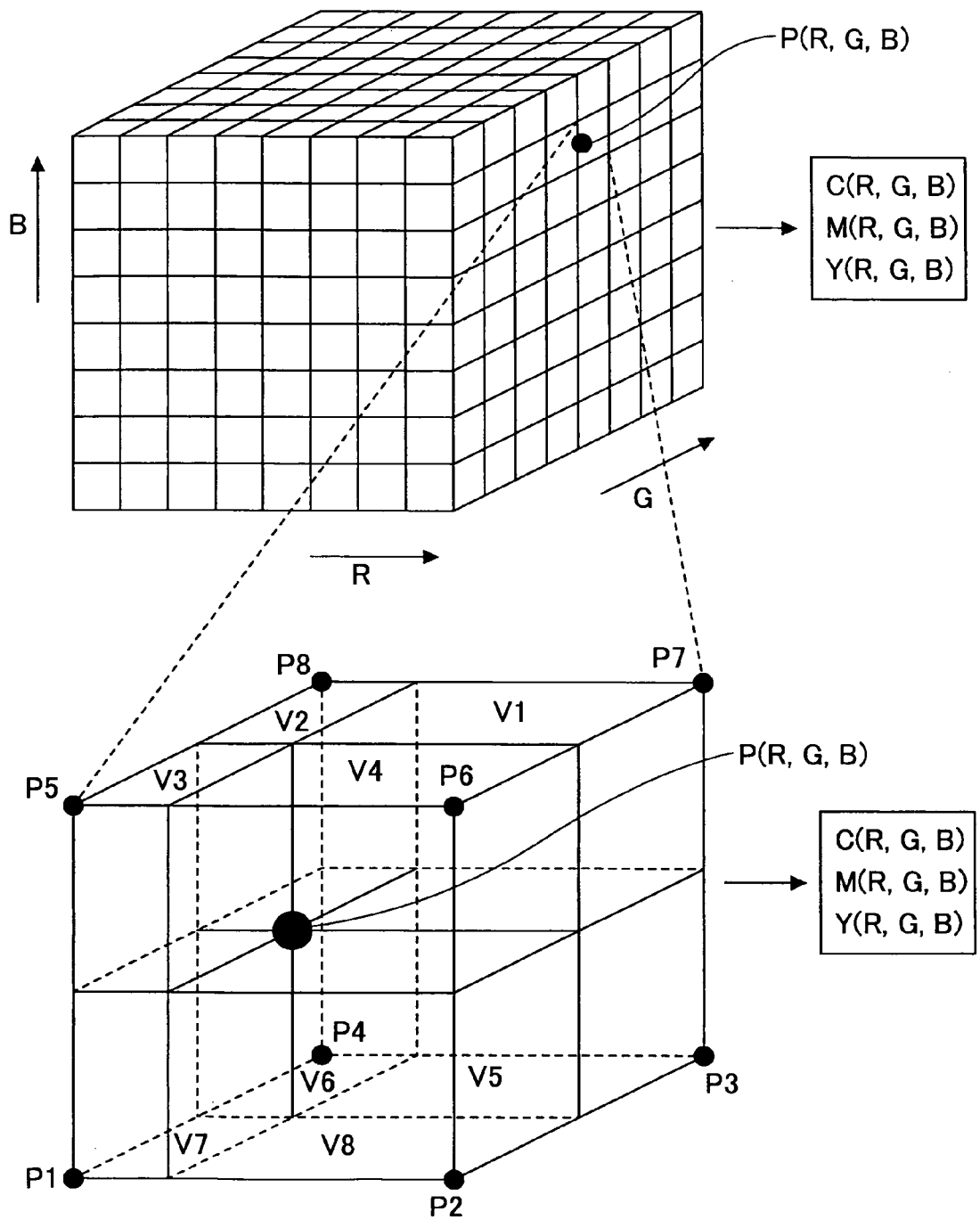
FIG. 5 is a diagram for explaining how an RGB space is divided into identical three-dimensional spaces (cubes) and how an output value of input coordinates (RGB) is calculated.

The following describes the memory map interpolation. In the case where an RGB space is the input color space, the RGB space is divided into identical three-dimensional spaces (cubes in this example) as shown in FIG. 5. To calculate an output value P corresponding to the input coordinates (R, G, B), the cube that contains the input coordinates is selected, and linear interpolation is performed using the weighted average of volumes v1-v8 of eight rectangular solids obtained by subdividing the selected cube at a point P based on output values of eight pre-selected corners of the selected cube and an input position within the cube (the distance from each corner).

Second Embodiment

Performing Object Determination in the Color Material Save Mode

This embodiment illustrates an example of color space conversion processing performed by the color space conversion unit 302 in the case where an object determination is performed in the color material save mode and the input image data are a natural image.

Figure 4:
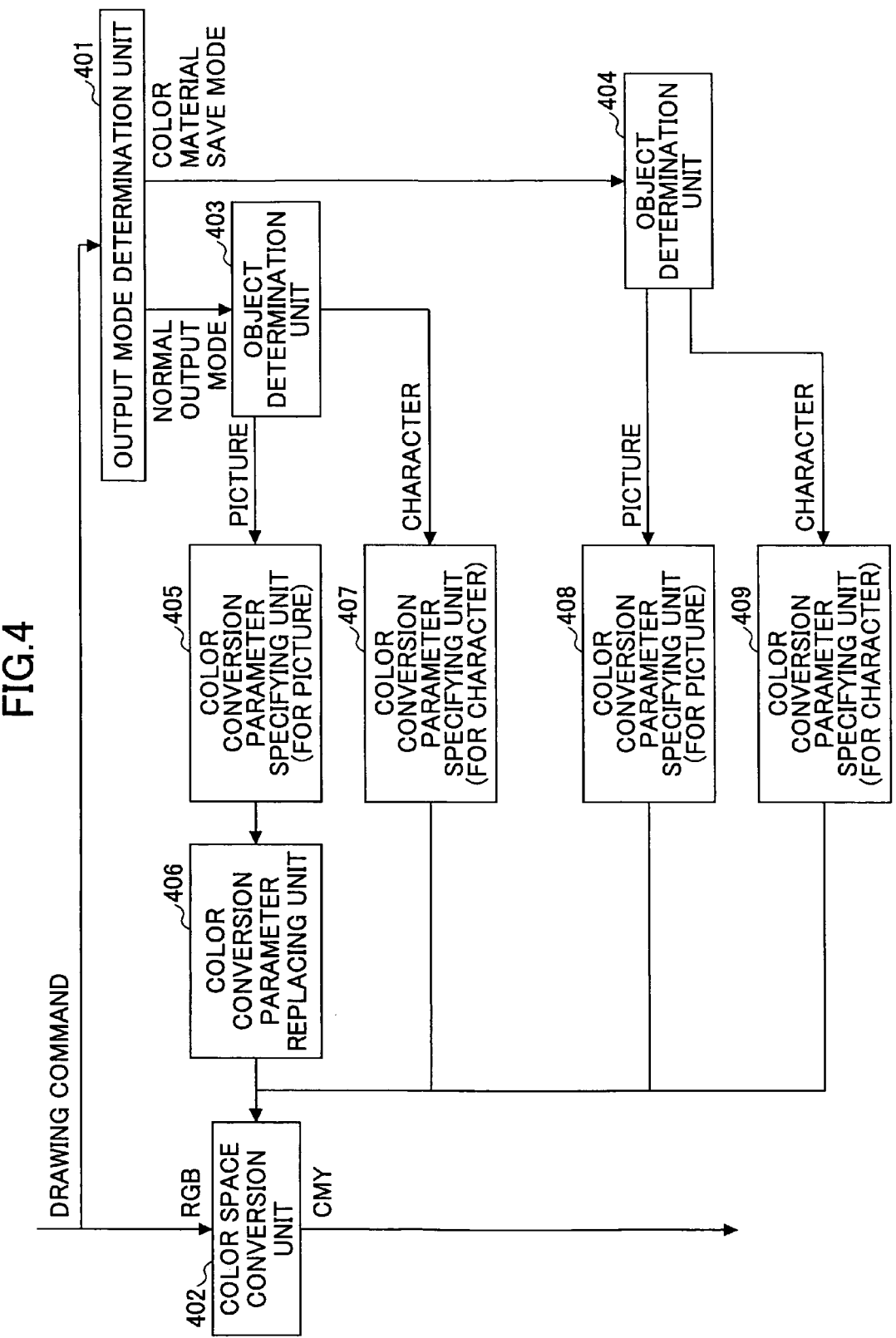
FIG. 4 is a diagram for explaining color space conversion processing according to an embodiment of the present invention.

FIG. 4 is a diagram for explaining color space conversion processing according to this embodiment. Referring to FIG. 4, the color conversion processing unit 31 includes an output mode determination unit 401 for determining an output mode specified by a user using the printer driver 23 of the computer 2, object determination units 403 and 404 for performing object determination, a color conversion parameter specifying unit 405 for specifying a color conversion parameter for a picture portion, a color conversion parameter replacing unit 406 for replacing the color conversion parameter, and a color conversion parameter specifying unit 407 for specifying a color conversion parameter for a character portion.

For the color material save mode, the color conversion processing unit 31 includes a color conversion parameter specifying unit 408 for specifying a color conversion parameter for a picture portion and a color conversion parameter specifying unit 409 for specifying a color conversion parameter for a character portion. The color conversion processing unit 31 further includes a color space conversion unit 402 for converting input color signals (RGB signals) supplied by the computer 2 into print color signals (CMY signals) using color conversion parameters.

In the normal output mode, the object determination unit 403 determines the types of objects, and the color conversion parameter specifying unit 407 specifies a character color conversion parameter for a character portion.

In the case where the object is a natural image or the like photographed by a digital camera, the color conversion parameter specifying unit 405 specifies a color conversion parameter, but the color conversion parameter is replaced to perform color correction according to the conditions under which image was photographed. For example, the RGB color distribution of each image is statically analyzed and then the color conversion parameter specified by the color conversion parameter specifying unit 405 is replaced to perform color correction appropriate for the image, such as making a backlit subject brighter, making green of trees and blue of sky color brighter, extracting color of human skin and converting the color of the skin into an ideal skin color, and adjusting an underexposed image to a proper exposure.

More specifically, in the case of replacing an RGB signal by an R'G'B' signal, an output CMY signal value corresponding to the input coordinate RGB coordinate value stored in the color conversion parameter specifying unit 405 is replaced by an output CMY signal value corresponding to the R'G'B' signal. This process is performed on all the RGB signals of an image, requiring processing time corresponding to the size of data and the type of processing.

On the other hand, in the color material save mode, object determination is performed, and the color conversion parameter specifying unit 409 specifies a conversion parameter that gives priority to readability for a character portion. Meanwhile, the color conversion parameter specifying unit 408 specifies a conversion parameter that gives priority to the processing speed for a picture portion. If a conversion parameter that gives priority to the processing speed is specified, the division number of the 3D look-up table is reduced, for example.

A similar operation may be performed by other image processing units. For example, in halftone processing, in the normal output mode, a character portion is processed with priority given to the readability, while a picture portion is processed with importance placed on the image quality, which imposes greater processing load. On the other hand, in the color material save mode, a character portion is processed with importance placed on the readability, while a character portion is processed with importance placed on the processing speed. More specifically, in the color material save mode, a picture portion filter may be used that imposes less processing load than the processing load imposed by a picture portion filter that is used in the normal output mode, or the number of processing lines and the size may be reduced more than the number of processing lines and the size in the normal output mode.

Example 3

Changing or Selecting Color Conversion Processing According to the Color Material Usage Rate in the Color Material Save Mode This embodiment illustrates an example of changing a processing pattern according to the color material usage rate target specified by a user in the color material save mode. In this embodiment, the color material usage rate in the normal output mode is 100%. Users have different demands in the case where the color material usage rate is high and in the case where the color material usage rate is low. For example, in the case where the color material usage rate is high, it is assumed that users demand printing with priority given to color matching and the image quality of a picture portion. On the other hand, in the case where the color material usage rate is low, it is assumed that users demand printing with priority given to the readability of characters and the processing speed but not to the image quality of the picture is demanded. That is, it is possible to satisfy user's demands by performing simpler image processing for lower material usage rate.

Figure 6:
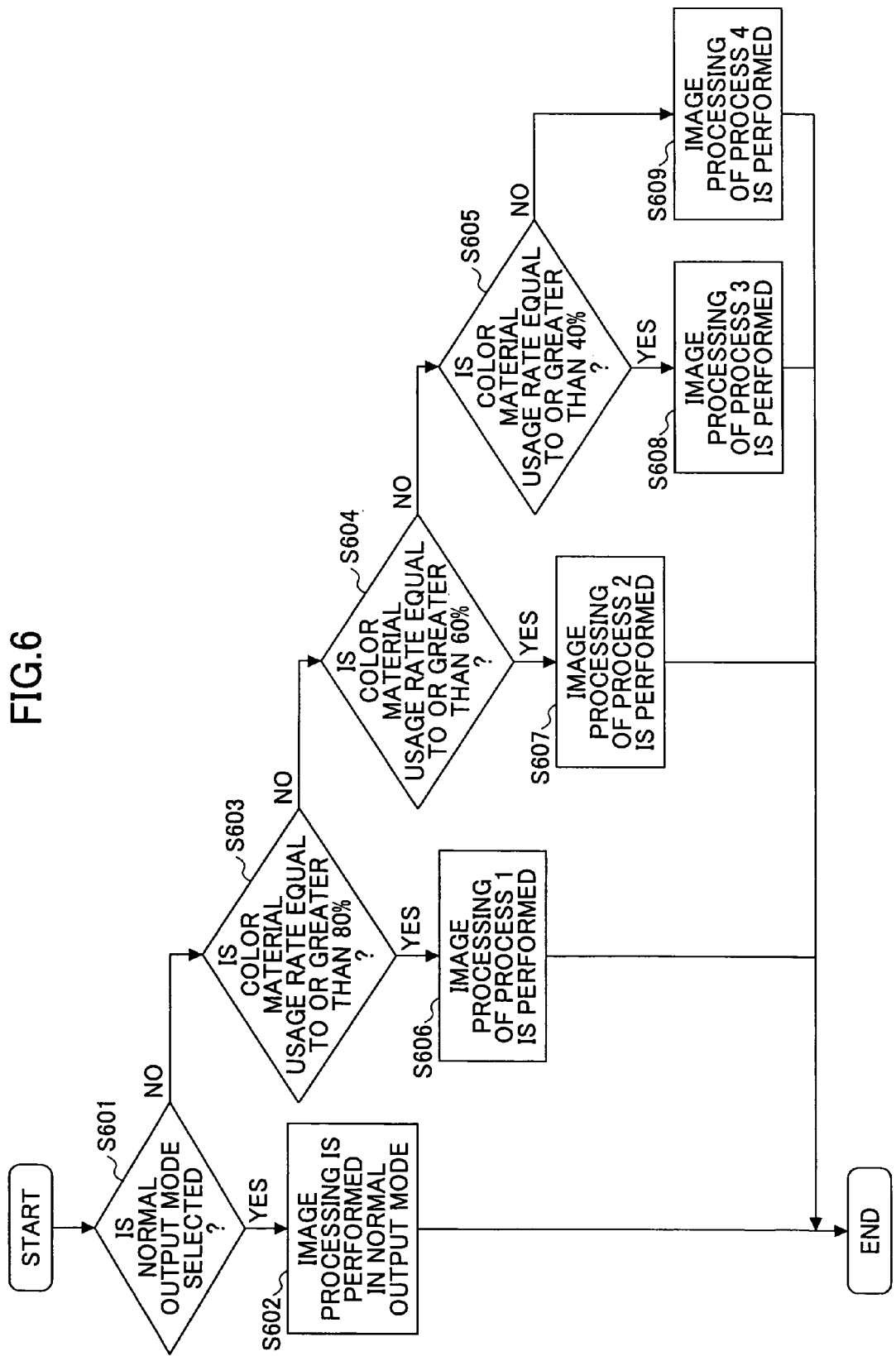
FIG. 6 is a flowchart illustrating a processing process according to an embodiment of the present invention.

FIG. 6 shows a processing flow of this embodiment. If a user selects the normal output mode in Step S601, then the process proceeds to Step S602, in which an image is output in the normal output mode. On the other hand, if the user selects the color material save mode and if the color material usage rate is equal to or greater than 80% (Step S603), the process proceeds to Step S606, in which Process 1 is performed.

If the color material usage rate is less than 80%. but is greater than or equal to 60% (Step S604), the process proceeds to Step S607, in which Process 2 is performed. If the color material usage rate is less than 60% but is greater than or equal to 40% (Step S605), the process proceeds to Step S608, in which Process 3 is performed. If the color material usage rate is less than 40%, the process proceeds to Step S609, in which Process 4 is performed.

The following describes exemplary image processing including color space conversion and halftone processing that is performed in each of Steps S606, S607, S608, and S609. In Process 1, since it is assumed that the image quality is relatively important, object determination is performed. Further, a color conversion parameter dedicated for an 80% save rate is prepared for each object and stored in the color conversion parameter specifying unit in order to emphasize the colors. With this parameter, the color difference from the colors that are expressed when the color material usage rate is 100% is minimized. Color space conversion using memory map interpolation is performed, and the same halftone processing is performed as in the normal output mode. That is, there is almost no improvement in the processing speed in the process of an 80% save rate.

In Process 2, a color conversion parameter dedicated for a 60% save rate is prepared for each object, and color space conversion using memory map interpolation is performed. Further, the processing load imposed by halftone processing is reduced compared with that imposed in the normal output mode, and the processing speed is increased compared with that achieved when the save rate is 80%.

In Process 3, object determination is not performed. Color space conversion and half tone conversion are performed on all the objects using character conversion parameters. The processing speed is increased compared with that achieved when the save rate is 60%.

In Process 4, since almost no importance is placed on the image quality, processing is performed with priority given to the processing speed. For example, the processing speed may be increased by performing complementary color conversion for color space conversion. Linear interpolation using the weighted average of volumes v1-v8 of eight rectangular solids by a 3D look-up table uses a considerable amount of memory and requires substantial time. Performing complementary color conversion increases the processing speed while maintaining the readability of characters.

$$C=255\_R$$

$$M=255\_G$$

$$Y=255\_B \qquad \text{Expressions (1)}$$

Further, the halftone processing unit uses a character filter.

As in the above-described embodiment, specifying a certain color material usage rate selected by a user in the printing condition settings of the printer driver and providing a unit for changing processes to be performed by the color conversion processing unit 31 of the image processing device 3 make it possible to achieve the color reproduction and the processing speed corresponding to the color material usage rate desired by the user.

According to the above embodiment of the present invention, an image processing device having a normal output mode for output at a normal image density and a color material save mode for reducing color material consumption can perform image processing that takes relatively less time to output an image even in the color material save mode.

Further, even in the color material save mode, the image processing device can perform image processing that provides good readability of characters and takes relatively less time to output an image.

Still further, even in the color material save mode, the image processing device can perform image processing that provides an image having a color image quality corresponding to the color material consumption conditions using less color material.

Examples of Recording Medium and Method

Figure 7:
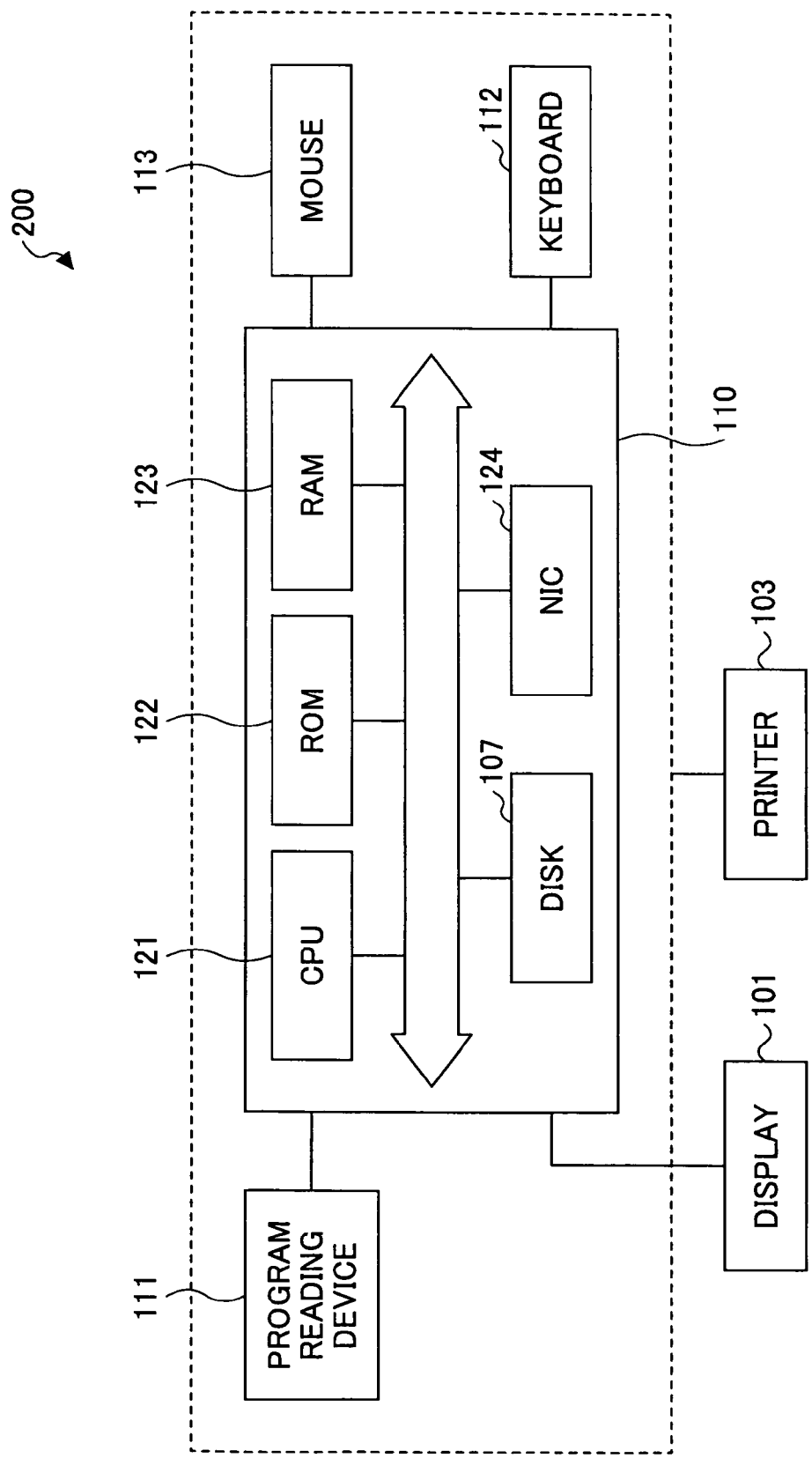
FIG. 7 is a diagram for explaining an example of an information processing system using a recording medium storing a program for executing image processing according to an embodiment of the present invention.

An exemplary information processing system using a recording medium storing a program for executing the above-described image processing is described below with reference to a block diagram of FIG. 7. The information processing system includes a computer 200 such as a workstation, a display 101, and a printer 103 as an image forming device. The computer 200 provides functions for the above-described color conversion processing, and includes an arithmetic processing unit 110, a program reading device 111, a keyboard 112, and a mouse 113.

The arithmetic processing unit 110 includes a CPU 121 for executing various commands to control the entire operation of the computer 200, a ROM 122 for storing programs to be executed by the CPU 121 and other fixed data, a RAM 123 for temporarily storing image data, etc., a DISK 107 as a large capacity storage device, and a NIC 124 for performing communications with devices on the network. The CPU 121, the ROM 122, the RAM 123, the DISK 107, and the NIC 124 are connected to each other with a bus.

The program reading device 111 reads various program codes stored in a storage medium such as a flexible disk, a hard disk, an optical disk (e.g., CD-ROM, CD-R, CD-R/W, DVD-ROM, DVD-RAM), a magneto-optical disk, or a memory card. The program reading device 111 may be a flexible disk drive, an optical disk drive, or a magneto-optical disk drive, for example.

The program codes stored in the recording medium are read out by the program reading device 111 and stored in the DISK 107. The CPU 121 executes the program codes stored in the DISK 107, thereby performing the above-described image processing.

In an alternative embodiment, upon executing the program codes in the computer 200, an OS (operating system) running on the computer 200 or a device driver may perform a part or all of the actual operations.

In another alternative embodiment, the program codes read from the recording medium may be written in a function extension card inserted in the computer 200 or a memory of a function extension unit connected to the computer 200 so that the function extension card or a CPU of the function extension unit performs a part or all of the actual operations according to commands of the program codes.

That is, the present invention may be implemented as a printer driver or a program that causes a computer to execute an image processing method of an embodiment of the present invention.

While the present invention is described in terms of preferred embodiments, it is apparent to those skilled in the art that variations and modifications may be made without departing from the scope of the invention.

The present application is based on Japanese Priority Application No. 2007-334204 filed on Dec. 26, 2007, with the Japanese Patent Office, the entire contents of which are hereby incorporated herein by reference.

What is claimed is:

1. An image processing device having a normal output mode for output at a normal image density and a color material save mode for reducing color material consumption, the image processing device comprising:

at least one of a plurality of image processing units configured to perform color space conversion processing, black processing, γ conversion processing, or halftone processing;

wherein said at least one of the plurality of image processing units configured to perform color space conversion processing, black processing, γ conversion processing, or halftone processing includes a plurality of processing units including a processing unit of low processing speed for relatively high image quality and a processing unit of high processing speed for relatively low image quality;

wherein, in the color material save mode, one or more of said at least one of the plurality of image processing units configured to perform color space conversion processing, black processing, γ conversion processing, or halftone processing execute the processing unit of high processing speed, and wherein one or more of said at least one of the plurality of image processing units configured to perform color space conversion processing, black processing, γ conversion processing, or halftone processing, that are selected in the color material save mode perform image processing with priority placed on readability of characters.

2. The image processing device as claimed in claim 1, wherein one or more of said at least one of the plurality of image processing units configured to perform color space conversion processing, black processing, γconversion processing, or halftone processing, that are selected in the color material save mode do not perform object determination.

3. The image processing device as claimed in claim 1, wherein in the color material save mode, color space conversion processing does not involve replacement of any color conversion parameter based on color distribution of input image data.

4. An image processing device having a normal output mode for output at a normal image density and a color material save mode for reducing color material consumption, the image processing device comprising:

at least one of a plurality of image processing units configured to perform color space conversion processing, black processing, γ conversion processing, or halftone processing;

wherein said at least one of the plurality of image processing units configured to perform color space conversion processing, black processing, γ conversion processing, or halftone processing includes a plurality of processing units including a processing unit of low processing speed for relatively high image quality and a processing unit of high processing speed for relatively low image quality;

wherein, in the color material save mode, one or more of said at least one of the plurality of image processing units configured to perform color space conversion processing, black processing, γ conversion processing, or halftone processing execute the processing unit of high processing speed, and wherein one or more of said at least one of the plurality of image processing units configured to perform color space conversion processing, black processing, γ conversion processing, or halftone processing, that are selected in the color material save mode perform image processing on a character region with priority placed on readability of characters and perform image processing on a non-character region at high processing speed.

5. The image processing device as claimed in claim 4, wherein one or more of said at least one of the plurality of image processing units configured to perform color space conversion processing, black processing, γ conversion processing, or halftone processing, that are selected in the color material save mode do not perform object determination.

6. The image processing device as claimed in claim 4, wherein in the color material save mode, color space conversion processing does not involve replacement of any color conversion parameter based on color distribution of input image data.

7. An image processing device having a normal output mode for output at a normal image density and a color material save mode for reducing color material consumption, the image processing device comprising:

at least one of a plurality of image processing units configured to perform color space conversion processing, black processing, γ conversion processing, or halftone processing;

wherein said at least one of the plurality of image processing units configured to perform color space conversion processing, black processing, γconversion processing, or halftone processing includes a plurality of processing units including a processing unit of low processing speed for relatively high image quality and a processing unit of high processing speed for relatively low image quality;

wherein, in the color material save mode, one or more of said at least one of the plurality of image processing units configured to perform color space conversion processing, black processing, γ conversion processing, or halftone processing execute the processing unit of high processing speed, and wherein, in the color material save mode, complementary color interpolation is performed in color space conversion processing.

8. The image processing device as claimed in claim 7, wherein one or more of said at least one of the plurality of image processing units configured to perform color space conversion processing, black processing, γ conversion processing, or halftone processing, that are selected in the color material save mode do not perform object determination.

9. The image processing device as claimed in claim 7, wherein in the color material save mode, color space conversion processing does not involve replacement of any color conversion parameter based on color distribution of input image data.

10. An image processing device having a normal output mode for output at a normal image density and a color material save mode for reducing color material consumption, the image processing device comprising:

at least one of a plurality of image processing units configured to perform color space conversion processing, black processing, γ conversion processing, or halftone processing;

wherein said at least one of the plurality of image processing units configured to perform color space conversion processing, black processing, γconversion processing, or halftone processing includes a plurality of processing units including a processing unit of low processing speed for relatively high image quality and a processing unit of high processing speed for relatively low image quality;

wherein, in the color material save mode, one or more of said at least one of the plurality of image processing units configured to perform color space conversion processing, black processing, γ conversion processing, or halftone processing execute the processing unit of high processing speed, wherein one or more of said at least one of plurality of the image processing units configured to perform color space conversion processing, black processing, γ conversion processing, or halftone processing, respectively, include a plurality of processing units including a processing unit of low processing speed for relatively high image quality and a processing unit of high processing speed for relatively low image quality for the color material save mode, and wherein, in the color material save mode, selection of the processing units is performed according to a color material consumption condition, and wherein, in the color material save mode, the higher a specified color material consumption is, the more the image quality is prioritized, and the lower the specified color material consumption is, the higher the speed is at which processing is performed.

11. The image processing device as claimed in claim 10, wherein one or more of said at least one of the plurality of image processing units configured to perform color space conversion processing, black processing, γ conversion processing, or halftone processing, that are selected in the color material save mode do not perform object determination.

12. The image processing device as claimed in claim 10, wherein in the color material save mode, color space conversion processing does not involve replacement of any color conversion parameter based on color distribution of input image data.

* * * * *